United States Patent
Chou et al.

(10) Patent No.: US 10,800,626 B1
(45) Date of Patent: Oct. 13, 2020

(54) DETACHABLE FEED ROLLER FOR USING IN THE AUTOMATIC FEEDER

(71) Applicant: Foxlink Image Technology Co., Ltd., New Taipei (TW)

(72) Inventors: You Chung Chou, New Taipei (TW); Lung Chen, New Taipei (TW)

(73) Assignee: Foxlink Image Technology Co., Ltd., New Taipei (TW)

( * ) Notice: Subject to any disclaimer, the term of this patent is extended or adjusted under 35 U.S.C. 154(b) by 0 days.

(21) Appl. No.: 16/574,352

(22) Filed: Sep. 18, 2019

(51) Int. Cl.
*B65H 3/06* (2006.01)
*B65H 9/16* (2006.01)
*F16D 41/12* (2006.01)
*B65H 9/00* (2006.01)

(52) U.S. Cl.
CPC ............ *B65H 9/166* (2013.01); *B65H 9/002* (2013.01); *F16D 41/125* (2013.01)

(58) Field of Classification Search
CPC .. B65H 3/0676; B65H 3/0669; B65H 3/0684; B65H 9/166
See application file for complete search history.

(56) References Cited

U.S. PATENT DOCUMENTS

| 7,484,723 | B2* | 2/2009 | Kuo | B65H 3/5238 |
| | | | | 271/10.09 |
| 8,475,069 | B2* | 7/2013 | Takahashi | B41J 13/076 |
| | | | | 271/113 |
| 2015/0008638 | A1* | 1/2015 | Yamamoto | B65H 5/06 |
| | | | | 271/256 |

* cited by examiner

*Primary Examiner* — Thomas A Morrison
(74) *Attorney, Agent, or Firm* — Lin & Associates Intellectual Property, Inc.

(57) ABSTRACT

A detachable feed roller for using in the automatic feeder includes: a rotating shaft provided with a first connection structure arranged at the end of the rotating shaft and an actuating part; a fixed feed roller arranged around the rotating shaft and driven by the rotating shaft; a one-way feed roller arranged around the rotating shaft and provided with a cam part; a transmitting rotor arranged around the rotating shaft and, the transmitting rotor being disposed between the actuating part and the cam part; wherein, the transmitting rotor is pushed toward the one-way feed roller while the rotating shaft rotates forward in accordance to the transmitting rotor; and pushed away from the one-way feed roller while the one-way feed roller rotates forward in accordance to the transmitting rotor.

7 Claims, 5 Drawing Sheets

DETACHABLE FEED ROLLER FOR USING IN THE AUTOMATIC FEEDER

BACKGROUND OF THE INVENTION

1. Field of the Invention

This invention relates to a feed roller of the automatic document feeder, particular to a replaceable feed roller.

2. The Related Art

In order to ensure the paper being fed is driven evenly, a plurality of feed rollers would be place along the feeding path. The feed rollers in the same row rotate in same angular velocity and the feed rollers which are at downstream direction rotate slight faster than the feed rollers which are at upstream direction to ensure the paper is flat. However, if the paper is skewed, the timing of the contact of each feed rollers with the subsequent paper will be different, and the subsequent paper will be skewed.

To avoid the problem of the conventional document feeder causes the subsequent paper to be skewed, a differential generating device for balancing the load between the feed rollers is provided in Japanese Patent No. 5814166. With the differential generating device, the driving force can be redistributed according to the load of feed rollers, thereby avoiding further skew of the subsequent paper. However, the friction between the feed roller and the paper is reduced with use, so the feed roller needs to be replaced periodically to avoid slippage of the paper. In order to reduce the cost of replacing the feed roller and to facilitate the user to replace the feed roller, the relevant structure of the feed roller and the feed roller itself must be simplified.

In order to keep the function of avoiding subsequent paper skew and to make the feed roller cheap and easy to replace, it is necessary to provide a detachable feed roller.

SUMMARY OF THE INVENTION

The objective of the present invention is to provide a feed roller of the automatic document feeder, particular to a replaceable feed roller with low cost and easy to be detached.

To achieve said objective, the present invention discloses a detachable feed roller for using in an automatic feeder includes: a rotating shaft that includes a first connection structure arranged at an end of the rotating shaft; a fixed feed roller which is arranged around the rotating shaft and directly driven by the rotating shaft; a one-way feed roller arranged around the rotating shaft; a transmitting rotor arranged around the rotating shaft, the transmitting rotor being disposed between the one-way feed roller and the rotating shaft; a first motion direction changing unit that includes an actuating part arranged around the rotating shaft and an actuating surface arranged on the transmitting rotor, the first motion direction changing unit pushing the transmitting rotor toward the one-way feed roller while the rotating shaft rotates forward relative to the transmitting rotor; a second motion direction changing unit that includes a cam part arranged around the one-way feed roller and a cam surface arranged on the transmitting rotor, the second motion direction changing unit pushing the transmitting rotor away from the one-way feed roller while the one-way feed roller rotates forward relative to the transmitting rotor; wherein, the pushing distance of the first motion direction changing unit is longer than the pushing distance of the second motion direction changing unit.

In a preferred embodiment, the actuating part comprises a plurality of actuating blocks symmetrically arranged radially around the rotating shaft.

In a preferred embodiment, the actuating surface comprises a plurality of transmission blocks symmetrically arranged radially around the transmitting rotor, and a surface of each of the transmission blocks in contact with the actuating block while the transmission blocks rotate forward is set as a sloped surface, and a surface of each of the transmission blocks opposite to the sloped surface is set as a stepped surface.

In a preferred embodiment, the cam part comprises a plurality of saw-shaped protrusions at a constant interval, and the saw-shape protrusions surrounding the axis of the rotating shaft.

In a preferred embodiment, the cam surface comprises a plurality of saw-shaped protrusions at a constant interval, and the surface of the cam part in contact with the cam surface while the cam part rotates forward is set as a stepped surface, and the other surface is set as a sloped surface.

In a preferred embodiment, the first connection structure comprises a ring wall coaxial with respect to the rotating shaft and a plurality of attach slots symmetrically arranged radially around the ring wall.

In a preferred embodiment, the automatic feeder comprises: a two-way motor that is selectively to rotate forward and backward; a transmission unit connected with the two-way motor for transmitting the driving force; a one-way clutch connected with the transmission unit for transmitting the driving force forward; a second connection structure connected with the one-way clutch, the second connection structure being arranged to cooperate with the first connection structure; and the detachable feed roller connected with the one-way clutch with the cooperation of the first connection structure and the second connection structure.

In a preferred embodiment, the second connection structure comprises a plurality of attach blocks symmetrically arranged radially.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

In order to describe the technical contents, structural features, purpose to be achieved and the effectiveness of the present invention, the detailed description is given with schema below.

It is impossible to list all of the arrangement direction of each components in the automatic feeder, so for the convenience of description, the rotation direction of the motor, rotating shaft, and feed roller are defined based on the moving direction of the paper. The direction that causes the paper to move from input tray toward the eject outlet is defined as the forward, and the direction opposites to the forward is defined as the backward.

Figure 1:
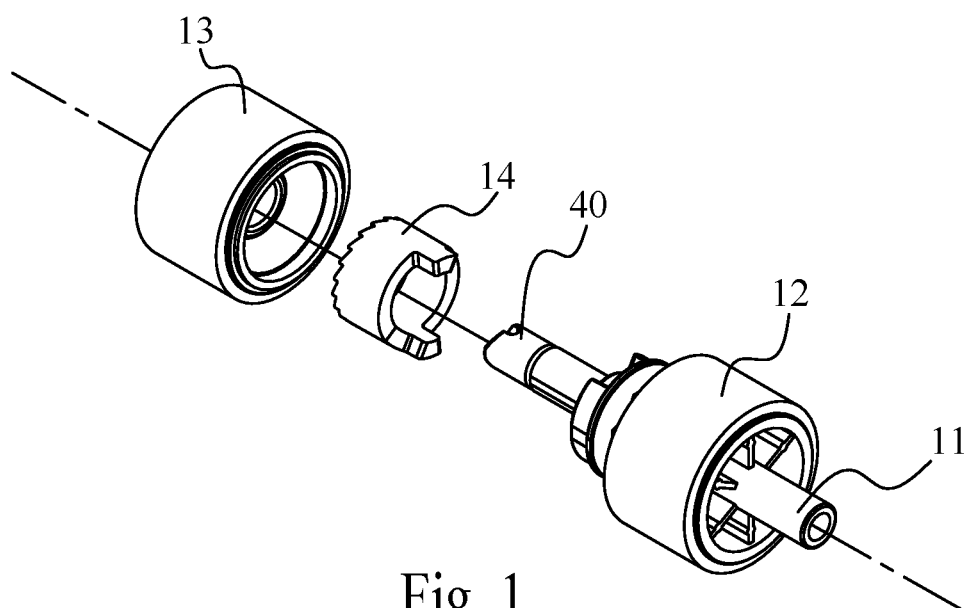
FIG. 1 shows an exploded view of a detachable feed roller of the present invention.

Referring to FIG. 1, the detachable feed roller 10 in the present invention includes a rotating shaft 11, a first connection structure 40 disposed on an end of the rotating shaft 11, a fixed feed roller 12 fixed on the rotating shaft 11 to rotate with the rotating shaft 11, a one-way feed roller 13 coaxially arranged around the rotating shaft 11, and a transmitting rotor 14 coaxially arranged around the rotating shaft 11 for transmitting a driving force from the rotating shaft 11 to the one-way feed roller 13. Wherein the transmitting rotor 14 is capable to transmit or cut off the driving force according to the relative angular velocity between the rotating shaft 11 and the one-way feed roller 13.

Figure 2:
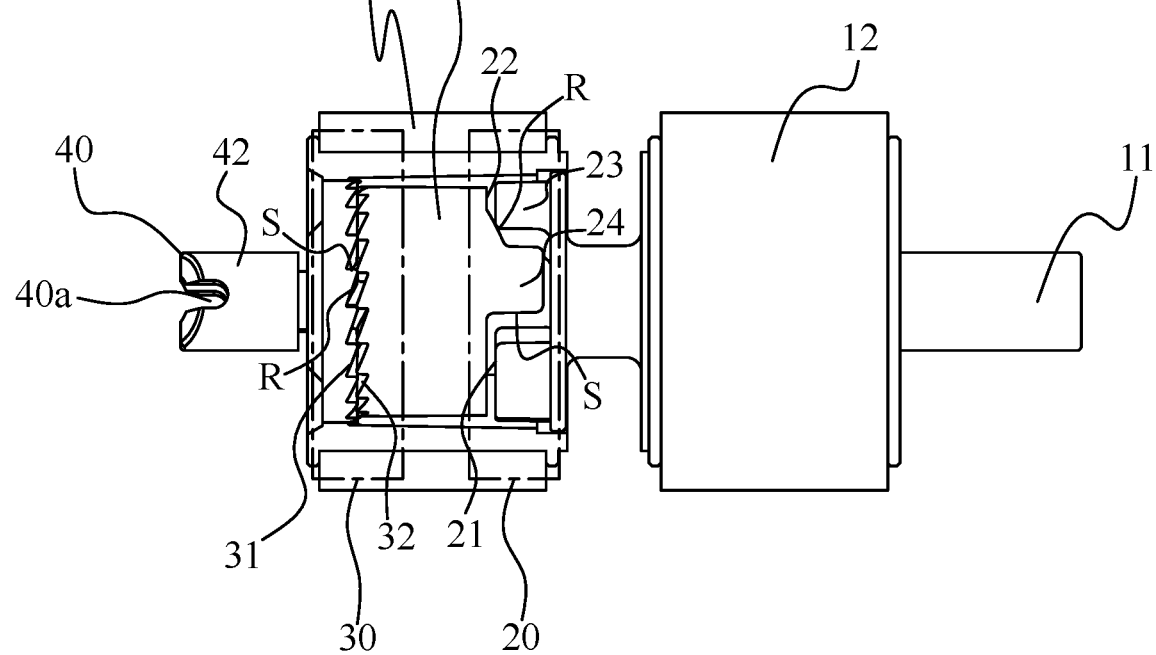
FIG. 2 shows a sectional view of a one-way feed roller of the present invention.
Figure 3A:
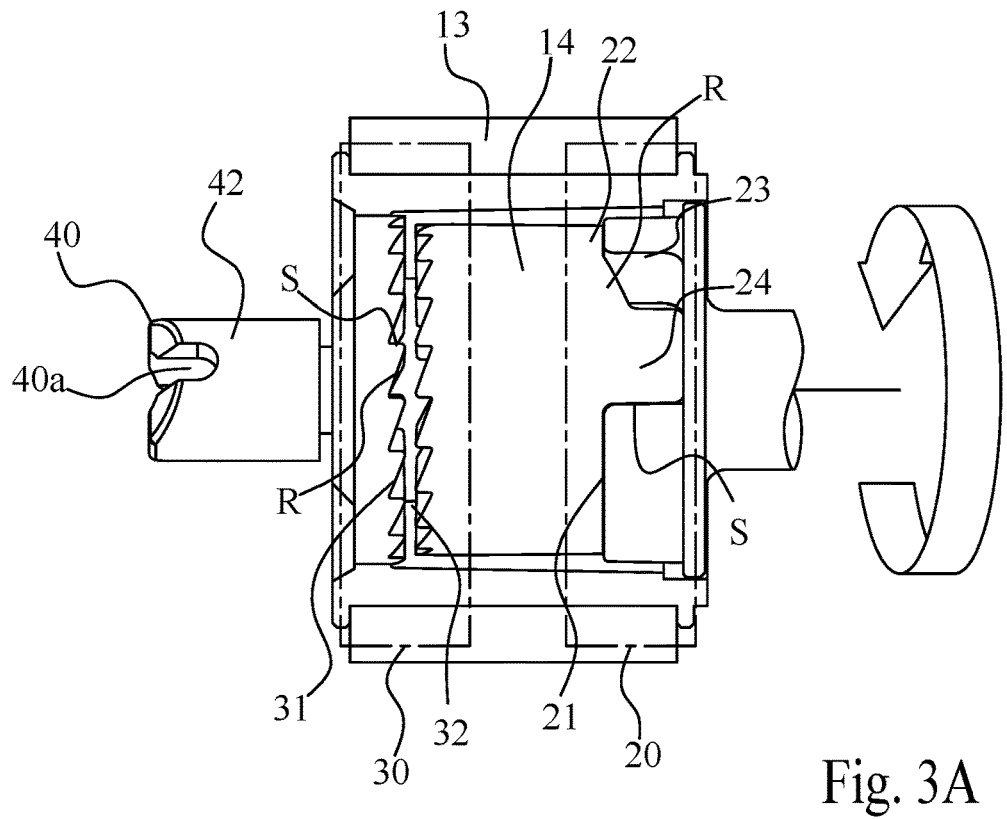
FIG. 3A is a schematic diagram showing an action of the transmitting rotor and the rotating shaft.
Figure 3B:
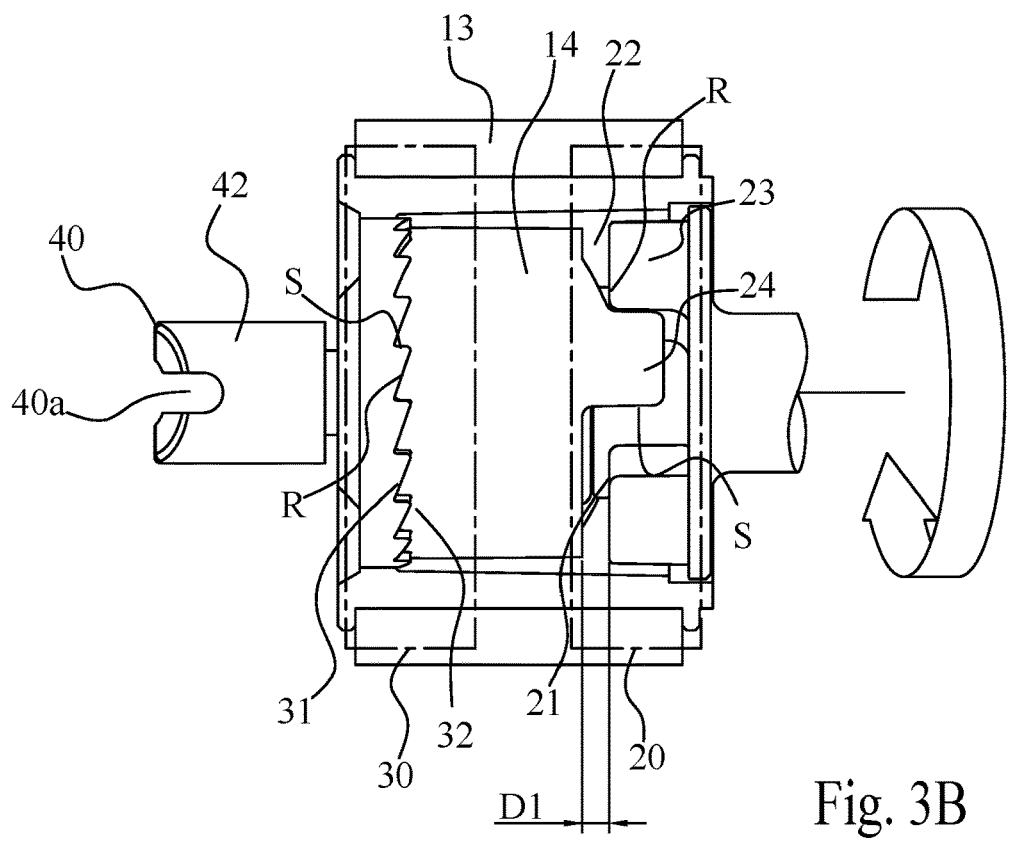
FIG. 3B is a schematic diagram showing another action of the transmitting rotor and the rotating shaft.

Referring to FIG. 2, in order to control the driving force transmitted via the transmitting rotor 14, a first motion direction changing unit 20 and a second motion direction changing unit 30 that transfer the rotating move to a sliding move along the rotating shaft 11 are disposed. The first motion direction changing unit 20 is arranged between the transmitting rotor 14 and the rotating shaft 11, and the second motion direction changing unit 30 is disposed between the transmitting rotor 14 and the one-way feed roller 13.

Wherein the first motion direction changing unit 20 includes an actuating part 21 arranged on the rotating shaft 11, and an actuating surface 22 arranged on the transmitting rotor 14. The actuating part 21 shown in this embodiment includes two actuating blocks 23 symmetrically arranged radially around the rotating shaft 11, and the actuating surface 22 includes two transmission blocks 24 symmetrically arranged radially around the transmitting rotor 14. The actuating block 23 cooperates with the transmission block 24 to transmit the driving force from the rotating shaft 11 to the transmitting rotor 14. In addition, a surface of each of the transmission blocks 24 in contact with the actuating blocks 23 while the rotating shaft 11 rotates in forward is set as a sloped surface (R) to transfer the driving force into a pushing force along the axis of the rotating shaft 11, and the opposite surface of the transmission block 24 is set as a stepped surface (S). Therefore, the transmitting rotor 14 would slide toward or away from the one-way feed roller 13 in accordance of a forward rotating direction and a backward rotating direction of the rotating shaft 11. As shown in FIG. 3B, the transmitting rotor 14 is pushed by the sloped surface (R) when the rotating shaft 11 rotates in forward, and the transmitting rotor 14 slides toward the one-way feed roller 13. The FIG. 3A shows the situation when the rotating shaft 11 rotates in backward, the transmitting rotor 14 is driven by the stepped surface (S) of the transmission block 24 to rotate without sliding.

Figure 4A:
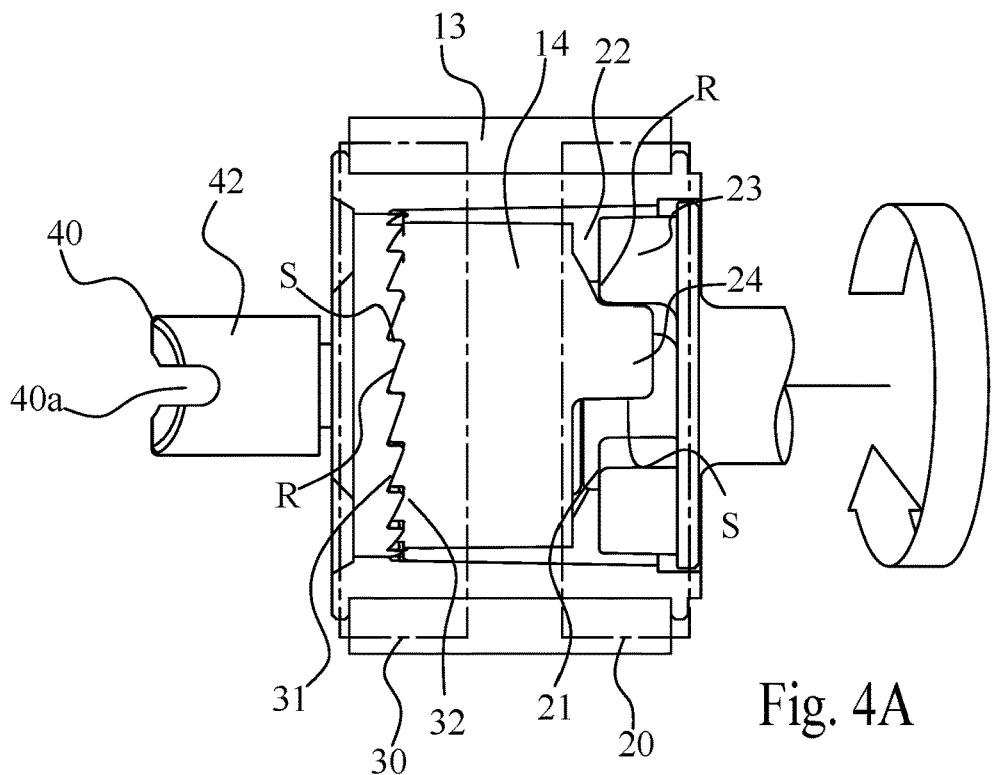
FIG. 4A is a schematic diagram showing an action of the transmitting rotor and the one-way feed roller.

Referring to FIG. 2, the second motion direction changing unit 30 includes a cam part 31 radially arranged on the one-way feed roller 13, and a cam surface 32 arranged on the surface of the transmitting rotor 14 that faces the cam part 31. Wherein the cam part 31 includes a plurality of saw-shape protrusions that forms a continuous protrusions ring, and the cam surface 32 also includes a plurality of saw-shape protrusions that forms a continuous protrusions ring. The surfaces of the protrusions in the cam part 31 in contact with the cam surface 32 when the cam part 31 rotates in forward are set as a stepped surface (S), and the opposite surfaces of the protrusions on the cam part 31 are set as a sloped surface (R). Therefore, the transmitting rotor 14 would be pushed away from the one-way feed roller 13 when the relative angular velocity of the transmitting rotor 14 to the one-way feed roller 13 is in backward. As shown in FIG. 4A, when the transmitting rotor 14 rotates forward related to the one-way feed roller 13, the transmitting rotor 14 contacts with the one-way feed roller 13 via the stepped surface (S) of the cam surface 32, so the second motion direction changing unit 30 doesn't push the transmitting rotor 14. However, when the transmitting rotor 14 rotates in backward related to the one-way feed roller 13 (no matter the absolute angular velocity of the transmitting rotor 14 is forward or backward) as shown in FIG. 4B, the transmitting rotor 14 contacts with the one-way feed roller 13 via the sloped surface (R), so the transmitting rotor 14 is pushed away from the one-way feed roller 13.

Figure 4B:
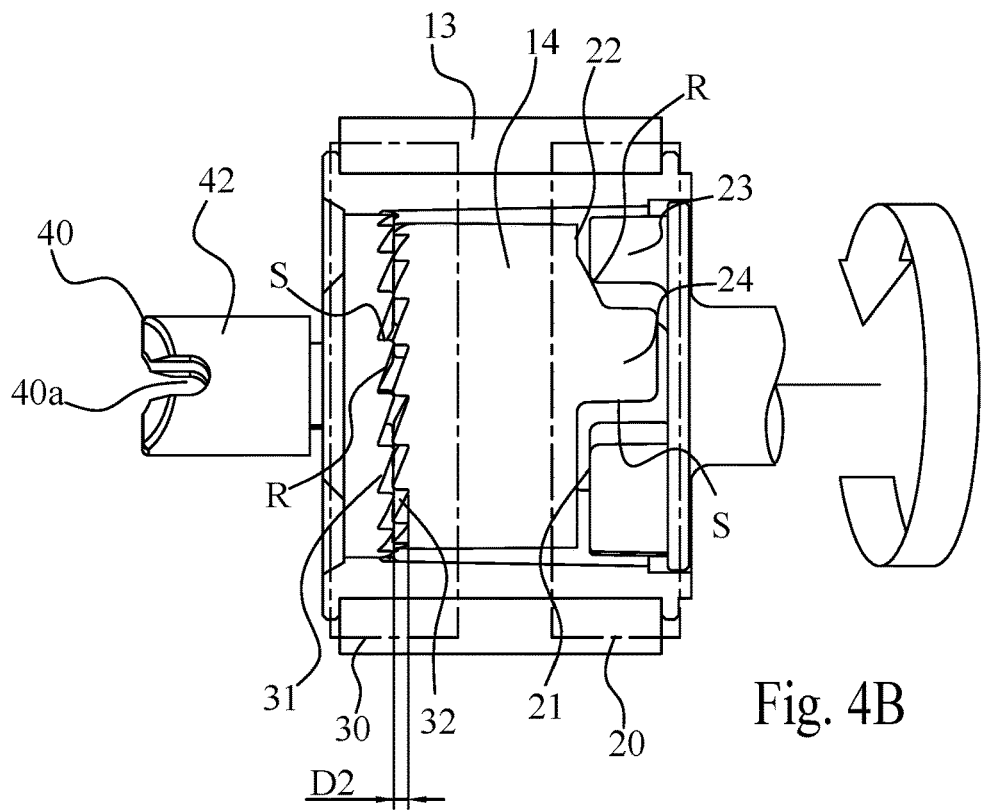
FIG. 4B is a schematic diagram showing another action of the transmitting rotor and the one-way feed roller.

Referring to FIG. 3B and FIG. 4B, the first motion direction changing unit 20 and the second motion direction changing unit 30 both have the ability to move the transmitting rotor 14, but sliding distances are different. The sliding distance (D1) that affected by the first motion direction changing unit 20 is set to be longer than the sliding distance (D2) that affected by the second motion direction changing unit 30 so the transmitting rotor 14 is always in contact with the first motion direction changing unit 20 and disengaged with the second motion direction changing unit 30 when the relative angular velocity of the transmitting rotor 14 to the one-way feed roller 13 is backward.

Referring to FIG. 2, the detachable feed roller 10 is detachable connected to the automatic feeder via the first connection structure 40, the first connection structure 40 includes a ring wall 42 arranged coaxial to the rotating shaft 11 and a plurality of attach slots 40a that symmetrically arranged on the ring wall 42.

Figure 5:
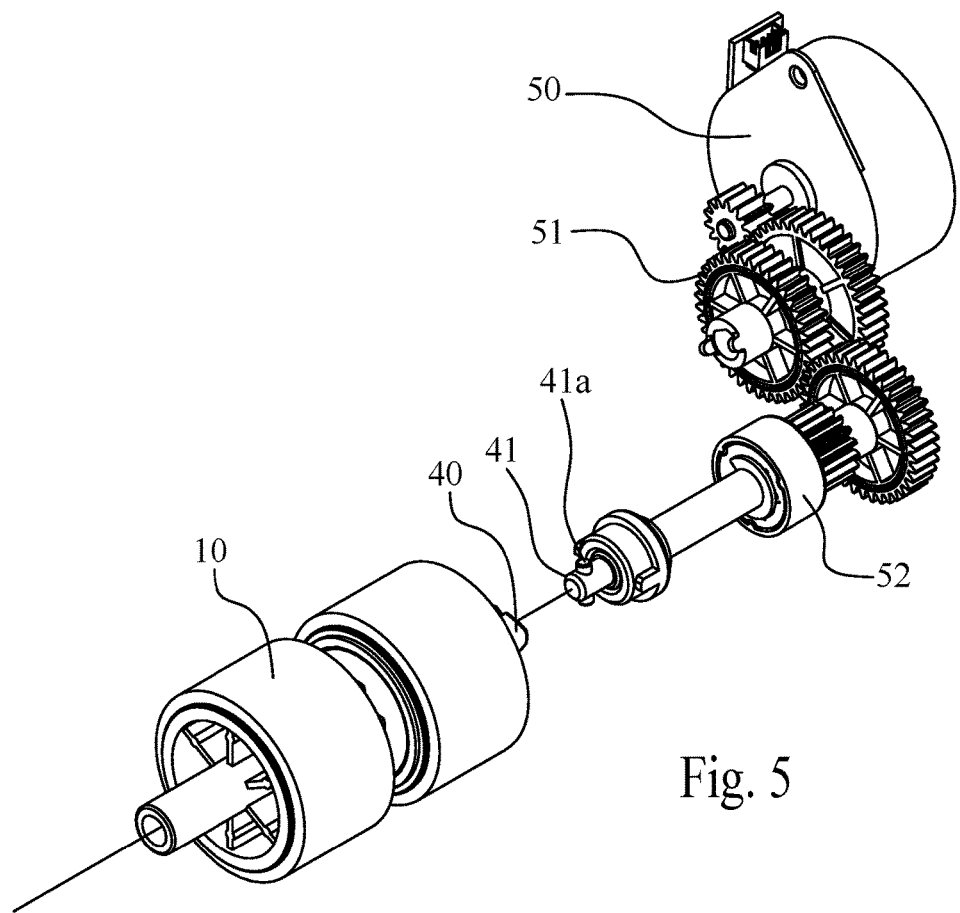
FIG. 5 shows an exploded view of the automatic feeder of the present invention.

Referring to FIG. 5, the automatic feeder includes a two-way motor 50 that is selectable to rotates in forward and backward; a transmission unit 51 connected to the two-way motor 50 for transmitting the driving force; a one-way clutch 52 connected with the transmission unit 51 to transmit the driving force in forward and cut off the driving force in backward; and a second connection structure 41 connected with the one-way clutch 52 that includes a plurality of attach blocks 41a symmetrically arranged. The detachable feed roller 10 connects with the one-way clutch 52 through the cooperation of the first connection structure 40 and the second connection structure 41.

Figure 6:
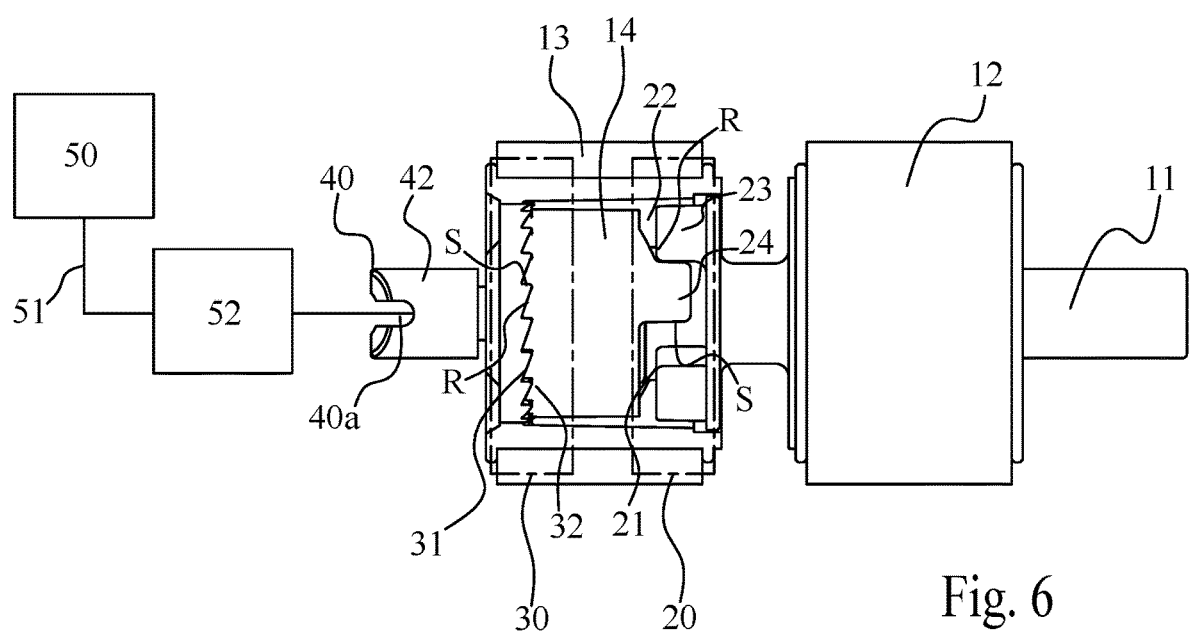
FIG. 6 shows a sectional view of the detachable feed roller in normal feeding process.
Figure 7:
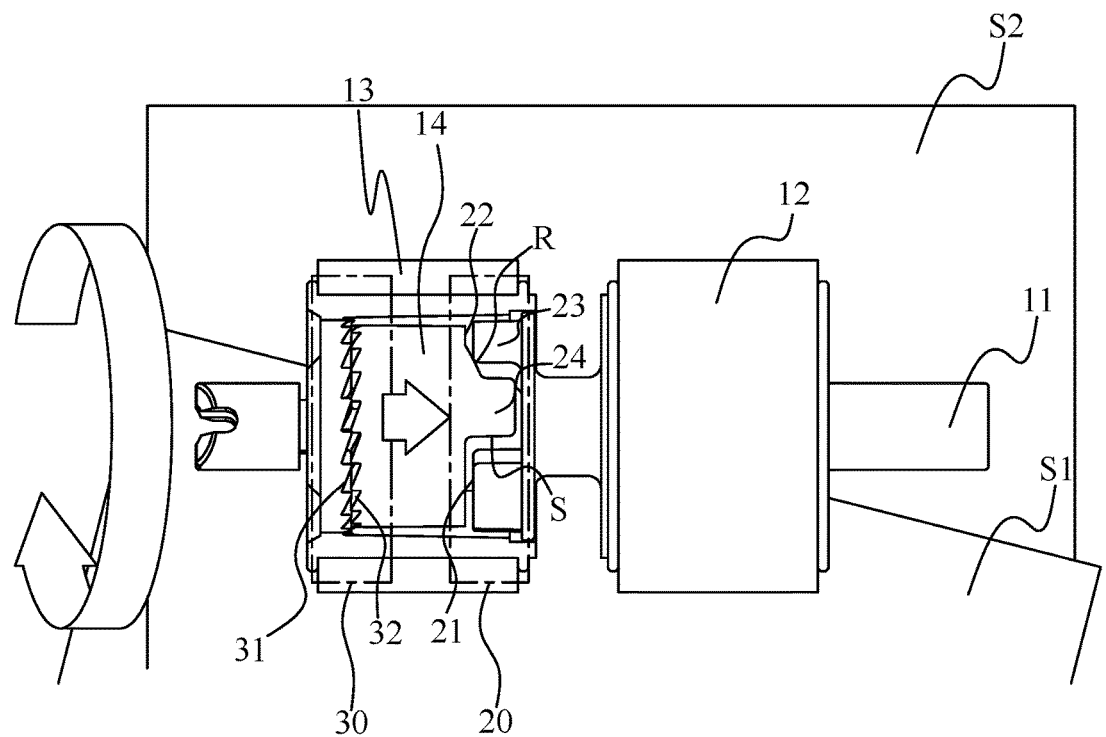
FIG. 7 shows a sectional view of the detachable feed roller when paper is skewed.
Figure 8:
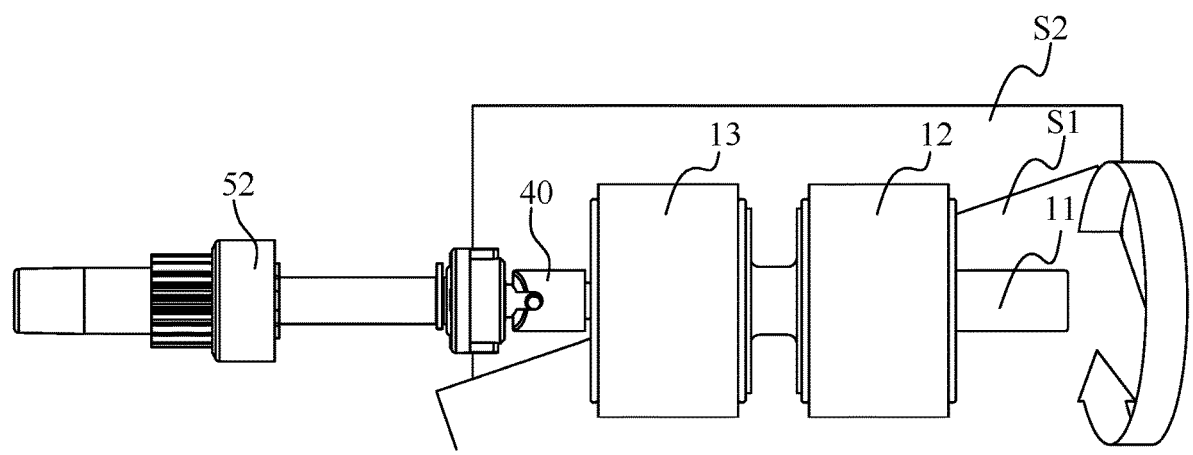
FIG. 8 shows a sectional view of the detachable feed roller when paper is skewed in another direction.

Referring to FIG. 6 to FIG. 8, the process of avoiding skew in the present invention is described as follow:

As shown in FIG. 6, the two-way motor 50 generates the driving force in forward in the normal feeding process, and the driving force is transmitted to the rotating shaft 11 through the transmission unit 51 and the one-way clutch 52 to cause the rotating shaft 11 rotate in forward. Therefor the first motion direction changing unit 20 pushes the transmitting rotor 14 toward the one-way feed roller 13 under the driven of the rotating shaft 11, and thus make the cam part 31 contacts with the cam surface 32 to drive the one-way feed roller 13 rotates in forward. In result, the fixed feed roller 12 and the one-way feed roller 13 rotate in same angular velocity and feed paper in forward.

Referring to FIG. 7, the paper (S1) is skewed in the feeding process due to factors such as the thickness of the paper (S1) is not unified or vibration of the automatic feeder, and the automatic feeder of the present invention can avoid the subsequent paper (S2) deflecting when the paper (S1) is unexpectedly skewed. As shown in the drawing, the contact area between the fixed feed roller 12 and the subsequent paper (S2) is larger than the contact area between the one-way feed roller 13 and the subsequent paper (S2) due to the skew of the paper (S1), so the one-way feed roller 13 is drew by the paper (S1) that is driven by the feed roller placed at a downstream direction (not shown) and rotates faster in forward than the rotating shaft 11. In result, the transmitting rotor 14 rotates in backward related to the one-way feed roller 13 to make the second motion direction changing unit 30 pushing the transmitting rotor 14 away from the one-way feed roller 13 so as to make the one-way feed roller 13 idling. With the one-way feed roller 13 idling, the subsequent paper (S2) will not be pulled too early, thereby achieving the effect of avoiding deflection of the subsequent paper (S2).

Referring to FIG. 8, the paper (S1) deflected in another direction in this embodiment and makes the fixed feed roller 12 having a larger contact area with the paper (S1), the one-way feed roller 13 having a larger contact area with the subsequent paper (S2). At this time, the fixed feed roller 12 has a forward angular velocity under the traction of the paper (S1), thereby releasing the one-way clutch 52 and allowing the fixed feed roller 12 to idle. By idling the fixed feed roller 13, the subsequent paper (S2) located beneath will not be pulled too early, thereby achieving the effect of avoiding deflection of the subsequent paper (S2).

What is claimed is:

1. A detachable feed roller for using in an automatic feeder includes:
    a rotating shaft that includes a first connection structure arranged at an end of the rotating shaft;
    a fixed feed roller which is arranged around the rotating shaft and directly driven by the rotating shaft;
    a one-way feed roller arranged around the rotating shaft;
    a transmitting rotor arranged around the rotating shaft, the transmitting rotor being disposed between the one-way feed roller and the rotating shaft;
    a first motion direction changing unit that includes an actuating part arranged around the rotating shaft and an actuating surface arranged on the transmitting rotor, the first motion direction changing unit pushing the transmitting rotor toward the one-way feed roller while the rotating shaft rotates forward relative to the transmitting rotor;
    a second motion direction changing unit that includes a cam part arranged around the one-way feed roller and a cam surface arranged on the transmitting rotor, the second motion direction changing unit pushing the transmitting rotor away from the one-way feed roller while the one-way feed roller rotates forward relative to the transmitting rotor, a pushing distance of the first motion direction changing unit being longer than a pushing distance of the second motion direction changing unit;
    wherein the automatic feeder comprises:
        a two-way motor that is selectively to rotate forward and backward;
        a transmission unit connected with the two-way motor for transmitting the driving force;
        a one-way clutch connected with the transmission unit for transmitting the driving force forward; and
        a second connection structure connected with the one-way clutch, the second connection structure being arranged to cooperate with the first connection structure, the detachable feed roller being connected with the one-way clutch with the cooperation of the first connection structure and the second connection structure.

2. The detachable feed roller for using in the automatic feeder as claimed in claim 1, wherein the actuating part comprises a plurality of actuating blocks symmetrically arranged radially around the rotating shaft.

3. The detachable feed roller for using in the automatic feeder as claimed in claim 2, wherein the actuating surface comprises a plurality of transmission blocks symmetrically arranged radially around the transmitting rotor, and a surface of each of the transmission blocks in contact with the actuating blocks while the transmission blocks rotate forward is set as a sloped surface, and a surface of each of the transmission blocks opposite to the sloped surface is set as a stepped surface.

4. The detachable feed roller for using in the automatic feeder as claimed in claim 1, wherein the cam part comprises a plurality of saw-shaped protrusions at a constant interval, and the saw-shape protrusions surrounding an axis of the rotating shaft.

5. The detachable feed roller for using in the automatic feeder as claimed in claim 4, wherein the cam surface comprises a plurality of saw-shaped protrusions at a constant interval, and a surface of the cam part in contact with the cam surface while the cam part rotates forward is set as a stepped surface, and the other surface is set as a sloped surface.

6. The detachable feed roller for using in the automatic feeder as claimed in claim 1, wherein the first connection structure comprises a ring wall coaxial with respect to the rotating shaft and a plurality of attach slots symmetrically arranged radially around the ring wall.

7. The detachable feed roller for using in the automatic feeder as claimed in claim 1, wherein the second connection structure comprises a plurality of attach blocks symmetrically arranged radially.

* * * * *